United States Patent
Parker

(10) Patent No.: US 6,642,954 B1
(45) Date of Patent: Nov. 4, 2003

(54) CONTROLLABLE STILL FRAME VIDEO TRANSMISSION SYSTEM

(75) Inventor: James Parker, Ontario (CA)

(73) Assignee: Digital Security Controls Ltd., Concord ( * ) Notice: Subject to any disclaimer, the term of this patent is extended or adjusted under 35 U.S.C. 154(b) by 0 days.

(21) Appl. No.: 09/486,612

(22) PCT Filed: Aug. 25, 1997

(86) PCT No.: PCT/CA97/00603
§ 371 (c)(1),
(2), (4) Date: Feb. 24, 2000

(87) PCT Pub. No.: WO99/11069
PCT Pub. Date: Apr. 3, 2000

(51) Int. Cl.[7] .................................................. H04N 7/18
(52) U.S. Cl. .................... 348/143; 348/152; 348/153; 348/154; 348/552; 725/108
(58) Field of Search ................................ 348/143, 154, 348/152, 159, 552, 22, 153, 155, 156; 725/108, 131; 340/541

(56) References Cited

U.S. PATENT DOCUMENTS

| | | | | |
|---|---|---|---|---|
| 4,494,111 A | * | 1/1985 | Rocci et al. ................ 340/3.51 |
| 4,511,886 A | * | 4/1985 | Rodriguez ................... 340/506 |
| 5,237,408 A | * | 8/1993 | Blum et al. .................. 348/154 |
| 5,657,076 A | * | 8/1997 | Tapp ............................ 348/154 |
| 5,671,009 A | * | 9/1997 | Chun .......................... 340/517 |
| 5,982,418 A | * | 11/1999 | Ely .............................. 348/153 |
| 6,069,655 A | * | 5/2000 | Seeley et al. ................ 348/154 |

* cited by examiner

*Primary Examiner*—John Miller
*Assistant Examiner*—Jean W. Désir

(57) ABSTRACT

A video capture controller for selective capture of video images from a plurality of video cameras, the capture controller having multiple video signal inputs for receiving signals from video source devices, an arrangement for receiving input signals from a security system, a processor for processing the received input signals of such arrangement and comparing the received signals with a predetermined set of possible received signals and, based thereon, determining a particular video capture protocol from a set of video capture protocols associated with the set of possible received signals, and a controller associated with the multiple video signal inputs and the processor, the controller having a video output, the controller selectively connecting the multiple video inputs with the video output based on the particular protocol determined by the processor.

16 Claims, 7 Drawing Sheets

| Time (0.1sec) | Camera ID | Time | ID | Time | ID | Time | ID |
|---|---|---|---|---|---|---|---|
| 0 | 8 | 2 | 2 | 4 | 2 | 10 | 8 |

Image 1    Image 2    Image 3    Image 4

FIG.5

CONTROLLABLE STILL FRAME VIDEO TRANSMISSION SYSTEM

FIELD OF THE INVENTION

The present invention relates to a video transmission system for use in electronic monitoring or security systems for buildings in which the capture and transmission of still-frame video images from multiple video cameras may be controlled as required

BACKGROUND OF THE INVENTION

It is well known in the security system art to include a video sub-system as part of a complete security system—for example, multiple still-frame video cameras or closed circuit TV cameras distributed around premises to be protected for the visual monitoring of the premises. Commonly, particularly in the case of industrial security systems, all such video cameras are connected-to an on-site security office. The operation of the video cameras in such a system typically is automatically controlled to have the video image from each camera displayed on a dedicated monitor or to cycle the video outputs from multiple cameras to one or more monitors. Usually, a security guard can manually override the automatic system to monitor the output of any camera or cameras as desired.

In such systems, the video images from the cameras may or may not be recorded for possible review in the event some significant event occurs. In an extensive system, every camera may have associated hardware to record multiple images, which can be accessed if a security event later indicates that images from a particular camera should be examined.

Such industrial-type video systems are not suitable for smaller security systems, such as may be installed in many commercial or residential premises. A typical security system installed in such premises would have a number of alarms or similar devices distributed around the premises all connected to a main control panel. The control panel normally has telecommunication capability whereby an alarm or other reportable condition may be transmitted by telephone, cellular telephone or radio communication to a remote location, such as the police or now more commonly a central monitoring service. The central monitoring service receives and analyzes data sent from the panel and determines whether conditions are such that a security guard or the police should be dispatched to the premises and/or a report made to the owner who may be available at some other location.

Only limited video capability has heretofore been included in such smaller systems. For example, a single video camera monitoring what is considered to be the most important part of the premises (e.g. perhaps a front door) may be connected to the alarm panel via a suitable camera controller/interface device. An example of such a controller/interface device is a device made by Sur-Gard Security Systems Inc. and sold under the DOWNLOOK DLM-4 trade-mark. In such a system, upon identification of a reportable alarm condition, the control panel opens a communication channel with the central monitoring service, transmits the alarm data to the service and then transfers the communication channel to the controller/interface device which then downloads the video data (which may represent multiple sequential images, or frames, from the single camera) over the same channel to the service. A delay time from alarm to a first video frame capture may sometimes be selected or be programmed. In addition, the time between frame captures can usually be selectable or programmable as well.

Through a multiplexing arrangement, the above video system may be expanded to include multiple video sources, whereby upon recognition of an alarm condition, the image (s) from the multiple cameras are downloaded to the panel in a fixed and predetermined sequence.

The difficulty with all such prior art systems is that the selection of video images cannot be controlled according to relevant alarm or system status conditions or the needs of the central monitoring service or of a remotely located owner. For example, when an alarm is detected all the collected images from all of the video sources are downloaded to the central monitoring service. The receipt and display of all such video data can be quite time consuming at the central monitoring service, thus tying up telephone lines and thus possibly interfering with other, possibly very serious, incoming alarm calls. Even though the particular alarm (e.g. front door broken into) may suggest that only the video images from the camera covering that location need be examined, all of the images from all of the cameras must be received in order to receive the one image of potential interest. This is very inefficient, expensive (in terms of telecommunications time), and possibly extremely serious if an incoming life-threatening alarm call cannot be received because the lines are busy on another call downloading video data of questionable value. It would be advantageous to be more selective about transmitting video data that is more likely to be useful.

Another problem in conventional systems is that the alarm inputs are directly connected to the control panel, which upon receipt of an alarm signal processes the signal according to its predetermined algorithms to determine if a reportable alarm condition exists. Upon determination that a reportable alarm condition does exist, then the panel may initiate a trigger signal to commence the image capture and downloading process. This method of controlling the video downloading process inherently involves a number of delays.

First, because the alarm panel is looking for true alarm conditions and does not wish to trigger alarm responses in the event of a false alarm, typically there is built-in delay period during which an alarm signal from an alarm device will not be recognized as a valid alarm signal. The signal must exist for a predetermined minimum time period, typically half a second, before the alarm signal itself will be accepted by the panel as being a valid alarm signal from the alarm device in question. This is known as the "debounce" time and this built-in delay is intended to allow the system to ignore transient conditions which normally are considered to be false alarms.

Second, there is the time required by the control panel to process the signal and determine that a valid reportable alarm condition exists.

Third, once such a reportable condition is determined to exist, the panel then initiates a trigger signal to the video system to initiate the capture and downloading process. There is an inherent bus latency period in establishing the communication from the panel to the video capture hardware.

Typically, the processing and bus latency times may amount to about one second. Thus, in total, delays from first receipt of an alarm signal to initiation of the video capture and downloading process may be as much as 1.5 or 2 seconds. These delays can make it very difficult to capture an image of a burglar. For example, if there is a break in at the front door, by the time the images of that location are captured, the burglar may be gone.

In large industrial or commercial security systems with many video cameras and large storage capacities, delays of this nature are not particularly important because the systems are producing images all the time which can later be accessed and reviewed if needed. However, in systems with smaller storage capacities, the problem can be quite severe.

SUMMARY OF THE INVENTION

According to one aspect, the invention is a video capture controller for selective capture of video images from a plurality of video cameras, the controller comprising multiple video signal inputs for receiving signals from video source devices, an arrangement for receiving input signals from a security system, a processor for processing the received input signals of such arrangement and comparing the received signals with a pre-determined set of possible received signals and, based thereon, determining a particular video capture protocol from a set of video capture protocols associated with the set of possible received signals, and a controller associated with the multiple video signal inputs and the processor, the controller having a video output, the controller selectively connecting the multiple video inputs with the video output based on the particular protocol determined by the processor.

According to another aspect, the invention is a process for capturing video images from multiple video sources in a system monitoring certain physical variables in or associated with a physical space, comprising monitoring the variables, identifying a set of conditions for such variables, selecting, in response to such set of conditions, a video image capture protocol from a pre-determined set of video image capture protocols each associated with at least one pre-determined set of conditions and capturing the video images in accordance with the selected protocol.

According to another aspect, the invention is a video capture controller for use in a system monitoring certain physical variables in or associated with a physical space, the system having multiple video sources, comprising a storage device storing a pre-determined set of video image capture protocols each associated with at least one pre-determined set of conditions of the variables, a receiver for receiving signals indicative of the condition of each such variable, a device for identifying a set of conditions for the variables, a retrieval device to retrieve from the storage device a specific video image capture protocol in response to the identified set of conditions, and, a video image capture device to capture the video images in accordance with said selected protocol.

According to yet a further aspect, the invention is a security system communications console for monitoring certain physical variables in or associated with a physical space, the system being adapted to receive signals from certain alarm detection devices distributed about the space, the signals being indicative of the condition of the variables being monitored by the devices, the console being adapted to connect to an external communication channel, comprising control panel for receiving said signals, for determining in response thereto whether a status report on the conditions of the variables should be made to an external location via the external communication channel, and, if so, for making said report, multiple video sources distributed about the space, a video capture controller comprising a storage device for storing a pre-determined set of video image capture protocols each associated with at least one pre-determined set of conditions for the variables, receiver for receiving from the alarm detection devices or from the panel signals indicative of the condition of each variable, device for identifying a set of conditions for the variables, retrieval device for retrieving from the storage device a specific video image capture protocol in response to the identified set of conditions, and, video capture device for capturing the video images in accordance with the selected protocol, and, video transmitter for transferring the captured video images to the external communication channel in the event that the panel makes a status report to an external location.

In yet a further aspect, the invention is a security system for monitoring certain physical variables in or associated with a physical space, the system being adapted to connect to an external communication channel, comprising alarm detection devices distributed about the space for generating signals indicative of the condition of the variables being monitored by the devices, control panel for receiving the signals, for determining in response thereto whether a status report on the conditions of the variables should be made to an external location via the external communication channel, and, if so, for making said report, multiple video sources distributed about the space, a video capture controller comprising a storage device for storing a pre-determined set of video image capture protocols each associated with at least one pre-determined set of conditions for the variables, receiver for receiving from the alarm detection devices or from the panel signals indicative of the condition of each variable, device for identifying a set of conditions for the variables, retieval device for retrieving from the storage device a specific video image capture protocol in response to the identified set of conditions, and, video image capture device for capturing the video images in accordance with the selected protocol, and, video transmitter for transferring the captured video images to the external communication channel in the event that the panel makes a status report to an external location.

In yet a further aspect, the invention is a video capture controller for capture of video images from at least one video source device, the controller comprising at least one video signal input for receiving signals from the at least one video source device, an arrangement for receiving input signals directly from at least one sensor in a security system and a processor for processing the received input signals of said arrangement and immediately triggering the capture of an image from said video source.

BRIEF DESCRIPTION OF THE DRAWINGS

Preferred embodiments of the invention are shown in the drawings, wherein:

FIG. 5 is a diagram showing a structure for a camera selection script for controlling the operation of a video controller means of the invention.

DETAILED DESCRIPTION OF THE PREFERRED EMBODIMENTS

Figure 1:
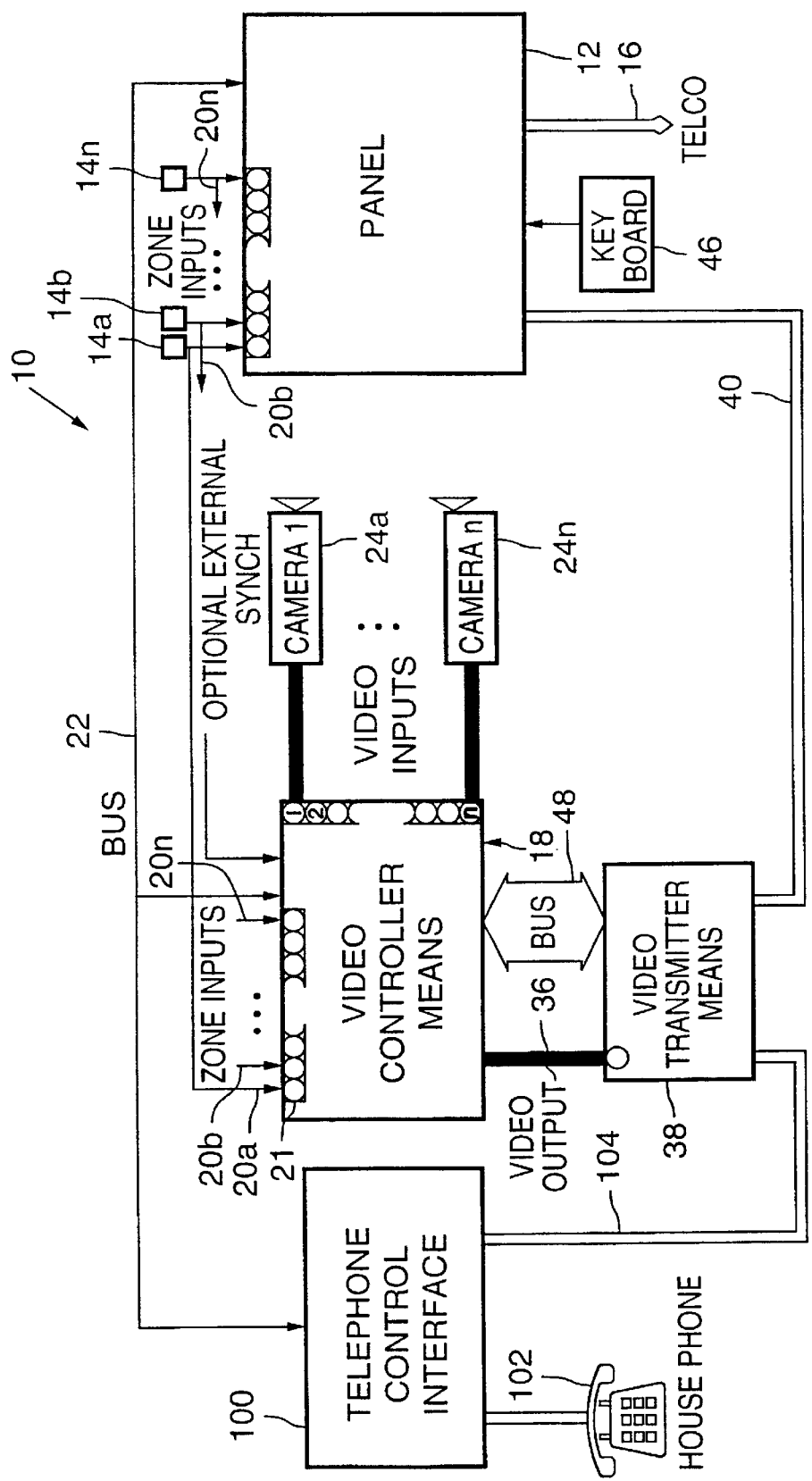
FIG. 1 is schematic of a security system with a video control system according to the invention.

Referring to FIG. 1, a security system according to the invention is indicated generally as 10.

Control panel 12 receives input from alarm or monitoring devices or sensors 14a, 14b through to 14n, where "n" can be any desired number of alarm or monitoring devices. Panel 12 receives alarm detection signals from devices 14 and processes them in accordance with the usual predetermined processing algorithms. If an alarm condition is determined to exist, then, in accordance with well known techniques, panel 12 establishes an external communication channel 16 such as through a telephone line, or a cellular or other radio transmission system, to a central monitoring service or some other remote location.

The outputs of devices 14, sometimes known as "zone inputs", are also separately input to video controller means 18 through connections 20a, 20b through to 20n. The reason for this will become apparent. Video controller 18 is connected via two-way communications bus 22 to panel 12. In addition, video controller means 18 is connected to conventional video cameras 24 or other video sources. Cameras 24 operate constantly, scanning still-frame images one after the other at the standard rate of about 30 per second with synch pulses inserted between images to mark the end of one image and the beginning of the next.

Figure 6:
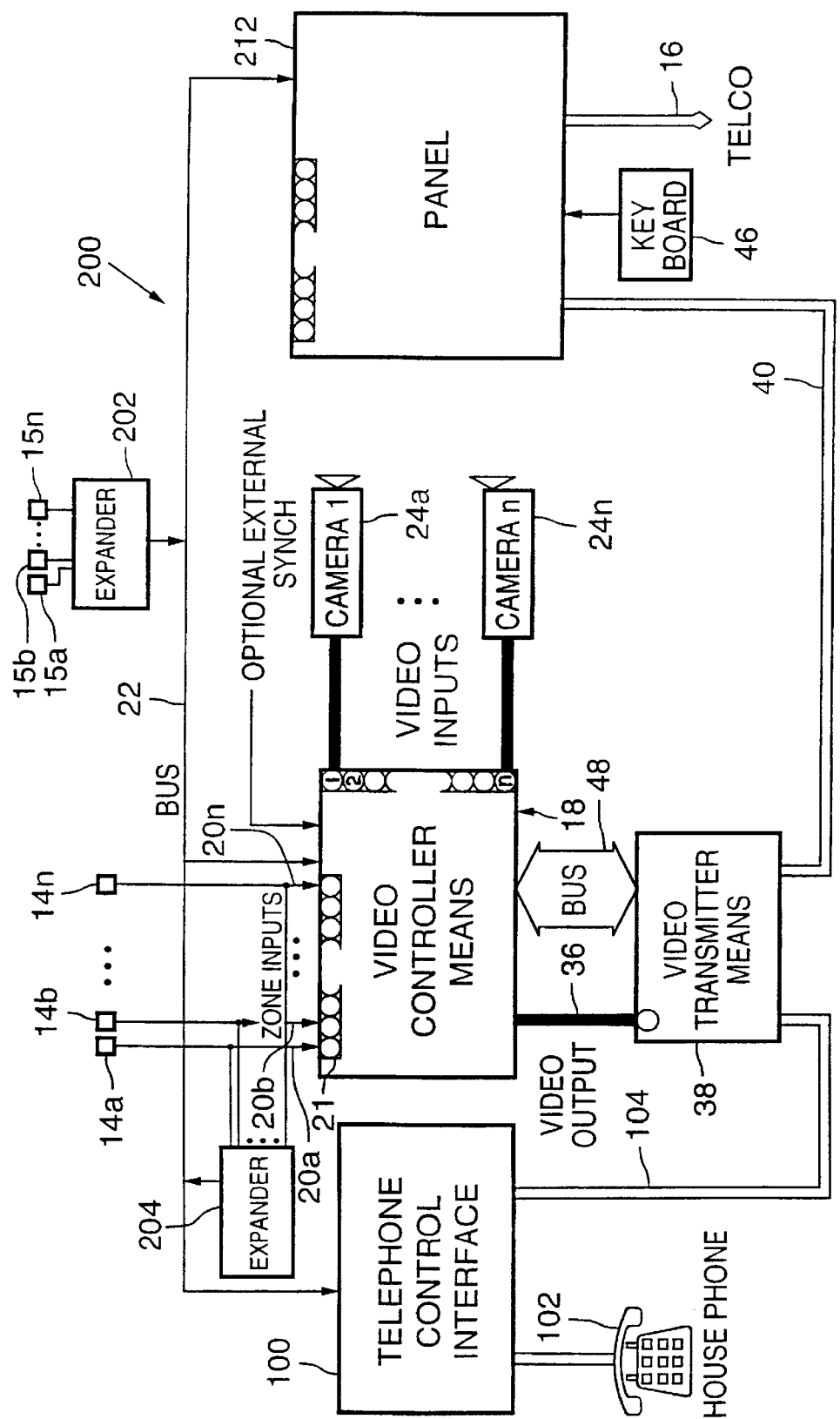
FIG. 6 is schematic of an alternate embodiment of a security system with a video control system according to the invention.

Referring to FIG. 6, in the alternate embodiment of system 200, the zone inputs may not be directly into panel 212. Instead, the alarm data from alarm devices 14 and 15 may be transferred to panel 212 via expander units 202 and 204. Expanders 202 and 204 are operable to receive the zone inputs from the various alarm devices 14 and 15 scattered about the premises. Each expander unit is provided with intelligence to receive and process the alarm device signals from its zone inputs and determine whether a valid reportable alarm condition exists. If a determination is made that there is such a condition, a suitable report is transferred via bus 22 to panel 212, which then takes any necessary further action including initiating any external reports over channel 16.

In such an alternate embodiment, when system 200 is set up, a decision will be made as to what input devices 14 are to be associated with video images. It is these devices which are then selected for direct connection to video controller means 18 and also to an associated expander unit 204. Controller 18 and expander 204 may be physically incorporated into the same device. Other devices 15 in the system 200 which are not to be associated with video images may be connected via one or more expander units 202.

Figure 4:
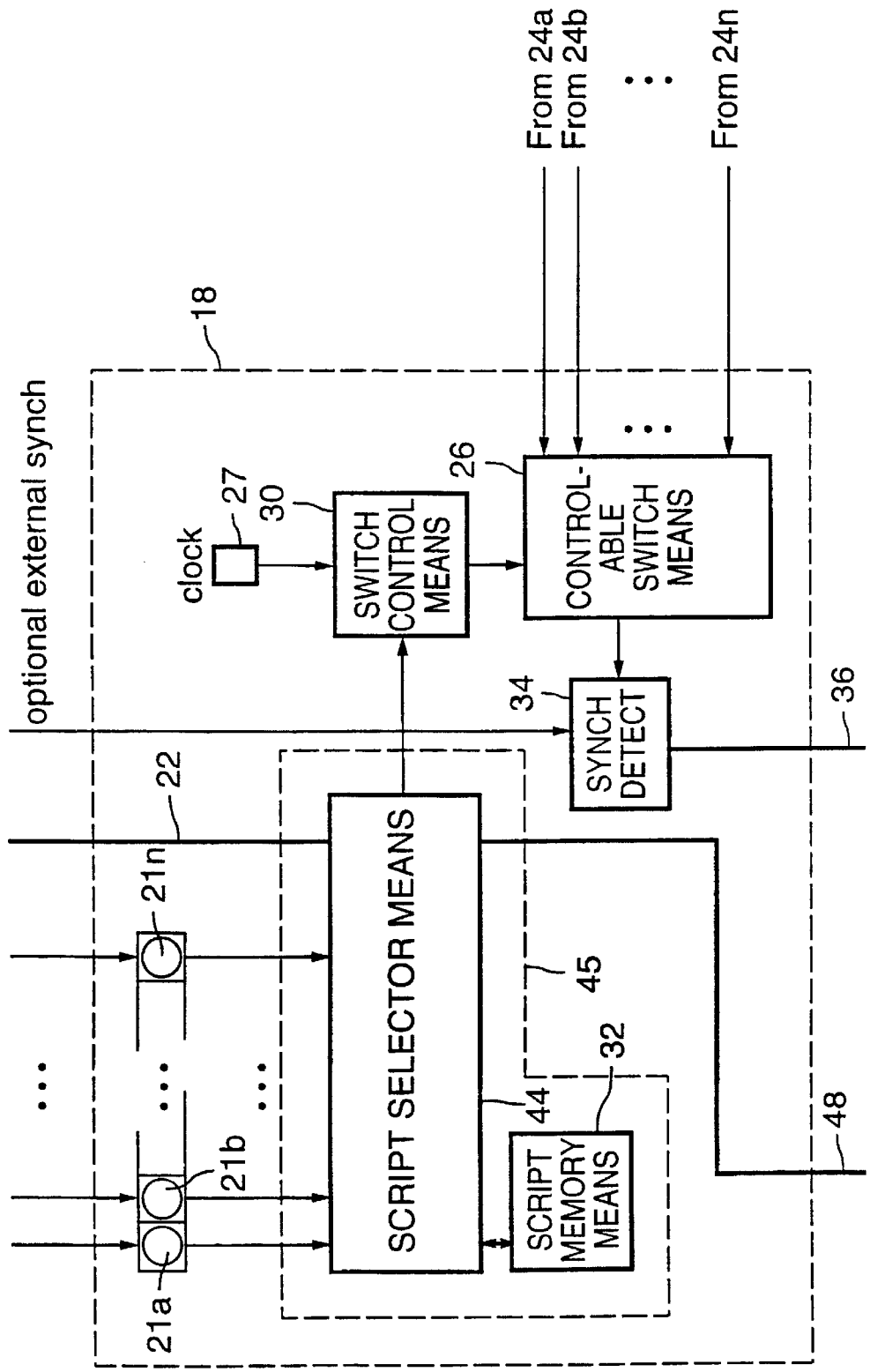
FIG. 4 is a schematic of the video controller means of the invention.

Referring to FIG. 4, video controller means 18 is shown in greater detail. A controllable video switch means 26 receives the signals from cameras 24a to 24n and is operable to select the camera from which it is desired to capture an image or frame.

The video data from a selected camera 24 is passed through switch means 26 to a vertical synch detector means 34. Detector means 34 receives the signal from the selected camera 24 and detects the first synch pulse. When a first synch pulse is detected, the immediately following video signal up to the next synch pulse is accepted or "grabbed" as the still-frame video image of interest from that camera at that time. The grabbed image is then transferred to a video link 36.

Synch detector 34 may be optionally made capable of receiving an external synch pulse, such as from a VCR, to further assist in the timing and transfer of the video data.

Figure 8:
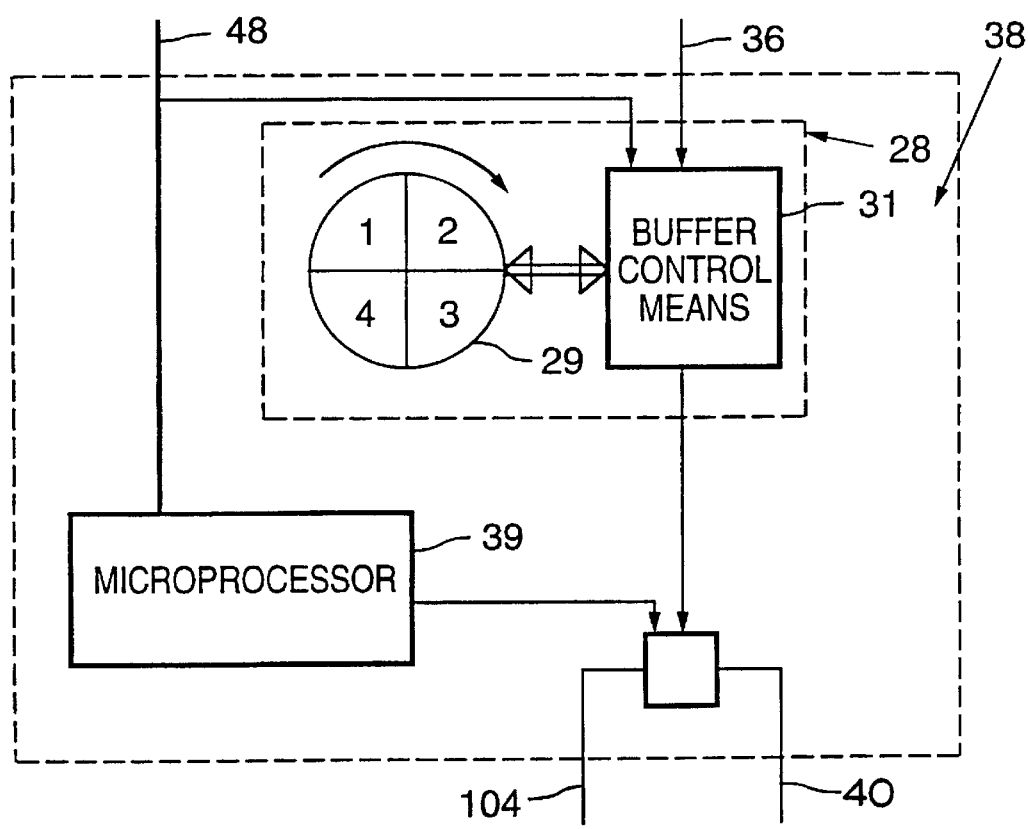
FIG. 8 is a schematic of the video transmitter means used in association with the video controller means of the invention.

Referring to FIGS. 1 and 8, video link 36 is connected to a video storage and transmitter device 38 which incorporates a rotating video storage buffer means 28, comprising memory means 29 and buffer control means 31. Memory means 29 may be sized to store as many video images as desired. However, in a preferred embodiment, it will be sized to store only a limited number of images, so that, as described in greater detail below, only a limited amount of time will be required for a remote central monitoring service to receive all the video data stored in the buffer. Accordingly, preferably, memory means 29 will have the capacity to store a number of images which is less than the number of cameras 24. In a system with say 8 cameras, memory means 29 may advantageously be made capable of storing the data for 4 video images, as shown in the illustrated embodiment.

Buffer control means 31 is operable to receive from link 36 the data for a first video image and direct it to be stored in location 1 of memory means 29, the data for a second image in location 2, the data for a third image in location 3 and the data for a fourth image in location 4. In the buffer means 28 illustrated, the data for a fifth image (if any) is then overwritten into location 1 erasing the data for the first image. Similarly, the data from sixth and subsequent images (if any) will sequentially overwrite the earlier data stored in the sequentially accessed locations. In this manner, in the illustrated embodiment, buffer means 28 always stores the data for the most recent 4 video images.

Referring again to FIG. 4, switch means 26 is controlled by switch control means 30. More specifically, the selection of the camera from which an image is to be captured and the timing of such selection is controlled by control means 30 according to a pre-determined camera selection protocol or script.

A camera selection script will specify the selection and timing of the operation of switch means 26. For instance, at a certain time as may be determined from a clock 27 (shown in FIG. 4) from some reference time (e.g. first receipt of a zone input), the image from a particular camera will be captured followed thereafter by such images from the same or other cameras at such subsequent times all as may be desirable. In the illustrated example, referring to FIG. 5, at time 0 decisecond image 1 will be captured by camera 8, followed by a second image at time 2 ds from camera no. 2, subsequently followed by a third image at time 4 ds again from camera no. 2, followed by a fourth image at time 10 ds again from camera no. 8.

A camera selection script may include instructions sufficient to fill all or only some of the memory spaces in buffer means 28.

Control means 30 may perform the script only a single time or the script may be repeated continuously according to an appropriate repetition control arrangement, as set out below. Whether a script should be repeated or not will depend, as set out in greater detail below, on events taking place.

Script selection itself will depend on the status or condition of all of the relevant system variables, or in other words on events taking place and on the status of the system. Referring again to FIG. 4, controller zone inputs 21 are connected to script selector means 44. Selector means 44 monitors the various zone inputs from the alarm devices 14 and system status data from panel 12 via bus 22. Depending on events taking place in the premises being protected and system status, selector means 44 assembles or identifies a particular set of variables for conditions as they exist at the time. Selector means 44 is operable to select or retrieve a camera selection protocol script from a set of predetermined scripts stored in memory means 32. Selector means 44 then transfers the selected script to switch control means 30 which in turn will, in accordance with the script, control the selection of cameras in the manner described above.

Selector 44 and memory means 32 may together be considered as a processor 45 for receiving input signals of said arrangement and comparing same with the predetermined set of possible received signals and, based thereon, determining a particular video capture script or protocol from a set of video capture protocols associated with the set of possible received signals.

Script memory means 32 may comprise a look-up table in which the different scripts for particular combinations of zone events and status conditions can be pre-programmed. It will be appreciated that a particular script may be associated with one or more sets of zone and status conditions.

For example, if script selector means 44 determines that there are no events taking place (i.e. no alarms in progress) and the security system is in an "armed" state, a first default camera selection protocol may be selected whereby cameras at the perimeter of the premises may be monitored. Perhaps, for example, the script will require that a first image be taken at the front door, followed by a second image at the back door, followed by a third image again at the front door, followed by a fourth image again at the back door. These are the type of conditions, and hence the type of script, in which repetition of the script would likely be desired until some other event occurs or there is a change in system status.

As another example, if script selector means 44 determines that there are no events taking place (i.e. no alarms in progress) and the security system is in a "disarmed" state (i.e. it is generally intended to allow people to move about the premises without initiating reportable alarm conditions), a second default camera selection protocol may be selected whereby cameras at only secured parts of the premises may be monitored. For example, such a camera selection script may call for a first image to be taken of a secured gun storage or cash storage area, followed by a second image at a low-traffic back door, followed by two more sequential images of the gun or cash storage area. This is another example of the type of conditions, hence the type of script, in which repetition of the script would likely be desired.

As yet a further example of script selection, assume that a first default script is being executed continuously to take images first at the front door then the back door. Selector means 44 then receives a zone input that indicates that the back door has been broken into. Selector means 44 now selects a new script, corresponding to such conditions, from memory means 32 and transfers same to the switch control means 30. This new script may for example require that a first image be taken at the back door and a second image at the gun storage area and that no other images be taken. Such a script would not be repeated. As a result of the pattern of images captured and sequentially stored in buffer means 28, one of the stored images would be a back door image at or shortly after the alarm and another would be an image at the back door before the alarm.

It is important to appreciate that, as the above example illustrates, if some condition occurs which causes script selector means 44 to select a new script from script memory means 32 and download same to switch control means 30, the newly selected script will initiate its operation so that the first image selected by the new script will overwrite only the oldest image stored in buffer 28. In this manner, images corresponding to times prior to the trigger event will continue to be stored in buffer means 28 unless the new script and the repetition control arrangement causes them to be overwritten. Accordingly, the normal "armed" and "disarmed" default scripts may result in useful pre-trigger information.

It is also important to appreciate that any events taking place in the premises to be protected or other events recognizable to the security system may be used in the script selection process. As in the examples above, the armed/disarmed status, or different types of armed/disarmed status may be a very important feature. Similarly, low battery, loss of AC power or other conditions may be relevant to what script should be selected. Information of this nature typically is monitored at or controlled by the alarm panel and is information which would be transmitted from panel 12 to script selector means 22 via bus 22.

It is also important to appreciate that combinations of conditions may lead to preferred script selections. For example, a break-in at the front door followed by a detection in the hall may suggest that a camera at the other end of the hall should be activated and a suitable script selected accordingly.

The various possibilities for scripts are virtually limitless. The programming of scripts will depend on the components included in a particular security system and on the needs and preferences of the owner.

Script memory means 32 may be pre-programmed through suitable means (not shown) at video controller means 18. Alternatively, script memory means 32 in a suitable programming mode could be programmed from keyboard 46 (or other system input means) via panel 12 and bus 22.

It will be appreciated that the ability to select scripts according to conditions as they occur becomes particularly advantageous as the number of cameras or video sources in a security system increases. A large number of cameras (with the corresponding advantage of a large number of monitoring viewpoints) may be accommodated with a system according to the invention, but without the large amounts of memory and corresponding hardware and software memory management systems of large-scale industrial systems. Even with only 4 cameras, and certainly with 8, the advantages of the system of the invention become readily apparent.

As noted above, a suitable repetition control arrangement may be desirable. There are many possibilities. For instance, in a preferred embodiment, as shown in FIG. 4, switch control means 30 is operable to execute each script only once after it is downloaded from selector 44. Selector 44 is operable to determine according to a script's location in memory means 32 whether it is to be executed continuously or only once. If a script is to be executed continuously, selector 44 will download the same script multiple times to switch controller 30, thus resulting in the multiple execution of the script by the switch controller 30. If a script is to be executed only once, then selector 44 will download it only once, then halt further operation until a suitable reset or resume signal is received. In the preferred embodiment, video transmitter means 38 is operable to supply the appropriate resume signal via bus 48, in the manner set out below. However, a suitable command could also be supplied by panel 12 across bus 22.

Figure 7:
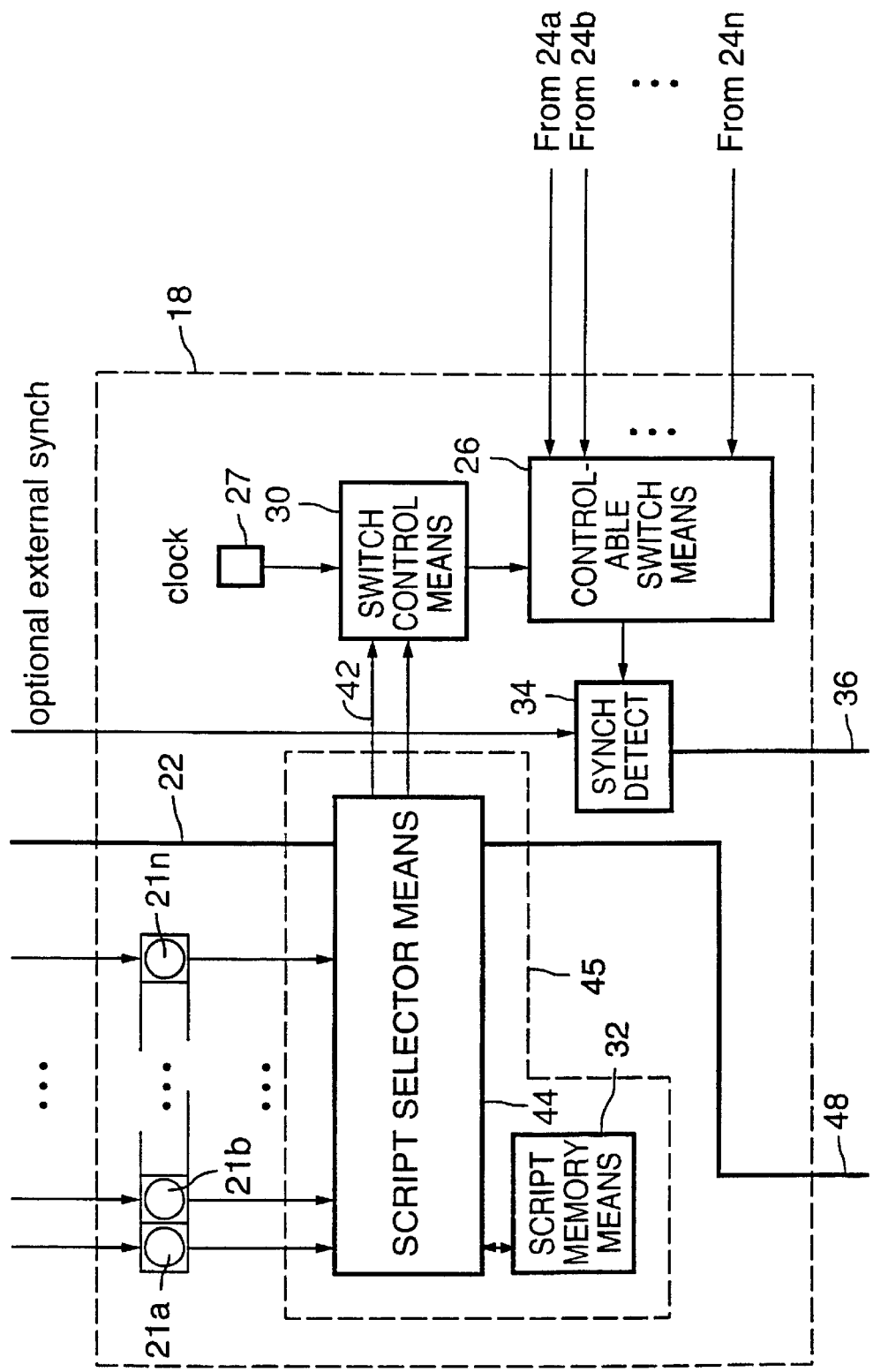
FIG. 7 is a schematic of an alternate embodiment of the video controller means of the invention.

As an alternative example, as shown in FIG. 7, selector 44 may also be operable to determine (e.g. according to a script's location in memory means 32 or according to a repetition control code which may be embodied into a script) whether a particular script is to be executed continuously or only once and to generate a script repetition control signal at connection 42 which is then recognized and acted upon by switch controller 30 accordingly. Alternatively, a repetition control code may be embodied into a script for direct recognition by switch control means 30. In either such case, reset or resumption means could be provided as set out above or resumption might occur automatically after a pre-determined time.

In the preferred embodiment, the direct connection of the zone inputs to script selector means 44 means that the delays associated with relying on a communication from a control panel or possibly an expander unit, as described above, are reduced or eliminated. In other words, as soon as a relevant event is detected in a zone, the script selection process is initiated and the cameras 24 selected and operated accordingly. If it should turn out later (say, 2 seconds later) that panel 12 or expander 204, as the case may be, determines that the event was merely a transient signal and therefore a false alarm, then no harm will have been done because panel 12 will not have reported falsely any alarm condition. However, if the event should later turn out to have been a true alarm condition, then the delays in capturing appropriate images will have been reduced or avoided.

In an alternate but less preferred embodiment, the zone inputs may only be at the panel or expander units in which case the system would have the advantages of script selection but not necessarily of reduced delays.

In response to suitable control commands from a microprocessor 39 in transmitter 38 (see FIG. 8), buffer control means 31 is operable to sequentially retrieve stored video data from the memory locations of memory means 29 and to download the data to a communication channel 40 which in turn is connected to panel 12.

In operation, if there are no relevant events taking place in the various zones or no unusual status conditions in the security system itself, script selector means 44 will have selected from script memory means 32 a suitable default camera selection protocol which will have been downloaded to switch control means 30. In accordance with such protocol, switch control means 30 will be controlling the operation of switch means 26 whereby to transfer the video data from the appropriate cameras 24 to buffer means 28. Buffer means 28 will sequentially store the video data for each selected image in its buffer memory means 29. The default script will likely be repeated continuously until conditions change.

In the event of some change in the system status, short of a reportable alarm condition, panel 12 will communicate the changes in status via bus 22 to script selector means 44. Script selector means 44 will retrieve the appropriate script for the new set of conditions from memory means 32 and download same to switch control means 30. As control means 30 implements the new script and new images are received from the selected camera(s), the images will sequentially overwrite the oldest images previously stored in buffer means 28. Again, such an alternate default script will likely be repeated continuously until conditions change.

If any alarm signal is received at a zone input, script selector means 44 will immediately select the appropriate new script from memory means 32 and again download same to control means 30. Again, new images are selected and captured in accordance with the new script from the cameras and again sequentially overriding the oldest images previously stored in buffer means 28. While the new script is operating and the appropriate images being captured, panel 12 or expander 204, as the case may be, is making its determination as to whether the zone input in fact constitutes a reportable alarm. If it is determined that there is a valid and reportable alarm condition, panel 12 or 212 will establish a communication link via channel 16 to an external location, for example a central monitoring service or the owner at a remote location. Panel 12 or 212 will first communicate the alarm data which will include information on whether video data is available. At the end of the alarm data transmission, panel 12 or 212 operates an internal relay switch (not shown) to link channel 40 to channel 16, whereby video transmitter means 38 may communicate directly with the remote location and download the video data stored in buffer means 28.

Figure 2:
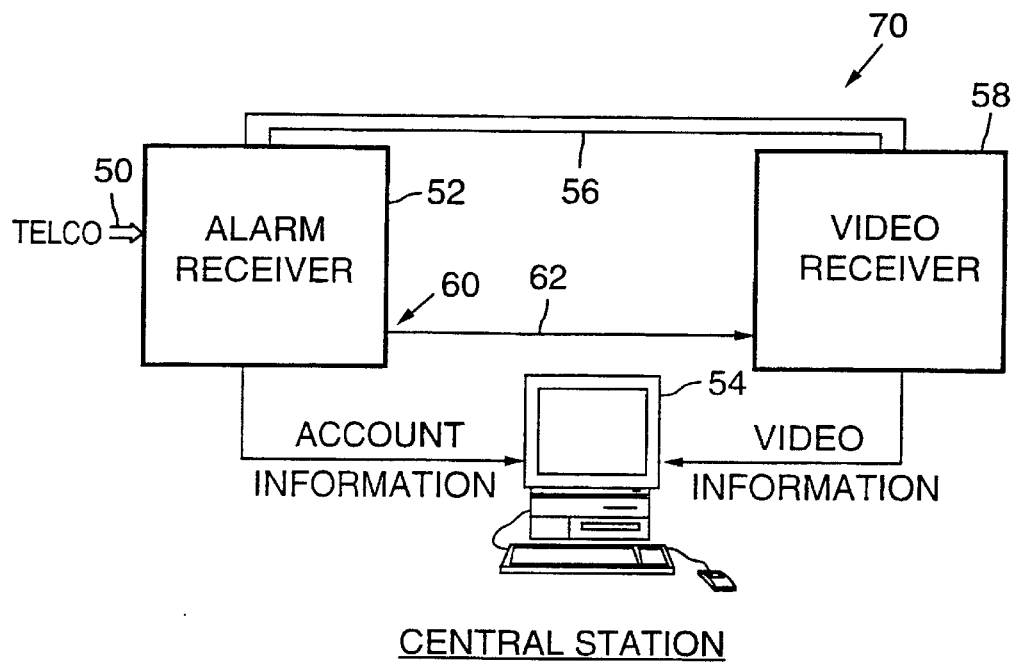
FIG. 2 is a schematic of the receiving system at a central monitoring station for receiving transmissions from the security system of the invention.

Referring to FIG. 2, a system as may be used by a central monitoring service to receive communications from a security system 10 is shown and indicated generally as 70. The service receives such communications via communication channel 50. Alarm receiver 52 is connected to receive incoming alarm reports from channel 50. Receiver 52, in accordance with its conventional functions, receives and interprets the incoming alarm data and associates same with suitable client and account information and the like. An alarm report is then transferred to a suitable output device 54, which may be a computer system with a video terminal.

If the incoming alarm data includes a code that video data is associated with the transmission, then upon completion of the receipt of the alarm data, the receiver 52 will operate an internal relay switch (not shown) to link channel 50 to channel 56 thus transferring the communication link to a video receiver 58. Video receiver 58 operates to sequentially receive the video data for the images stored in buffer means 28 and to present same in a suitable signal for displaying on a video output device such as the video terminal of the computer system 54. Video receiver 58 may communicate with video transmitter 38 to control the downloading of video data.

If system 70 has an output device 54, which is not a computer but some other video recording device such as a VCR, it may be advantageous for alarm receiver 52 to be supplied with an RS-232 output port 60 whereby the account and alarm data may be output in a video-compatible format. Port 60 may be connected by line 62 to video receiver 58 whereby receiver 58 can receive the alarm and account data and combine same with the video data for storage on the video recording device.

In operation, an incoming alarm report is received by receiver 52. The alarm data is stripped therefrom and merged with other relevant data and all relevant alarm data transferred to output device 54. The video data portion of the transmission is then transferred via lines 50 and 56 to receiver 58 which reconstructs the images and transfers them to a suitable video display unit associated with output device 54. The video images and other alarm data may be stored in conventional manner on appropriate hardware associated with device 54.

Because only a very few images are received, relative to the number of cameras on site, the communication channel 50 is not tied up unnecessarily and it will be made available to receive other, potentially important, incoming calls in relatively short order.

At the end of the transfer of video data from transmitter 38 to receiver 58, a signal on bus 48 from microprocessor 39 will change, indicating to script selector means that the transmission is complete and that script selection may resume.

It will be appreciated that once a communication link is established between transmitter 38 and receiver 58, it may be useful to keep the channel open after completion of the transfer of the video data from buffer means 28. For instance, commands could be input by receiver 58 to instruct video controller means 18 to capture specified additional images from certain cameras. Such control commands may be tranferred from transmitter 38 to controller 18 via bus 48.

Referring again to FIG. 1, system 10 is shown as including an optional telephone control interface device 100 which is connected to house phones 102 and via a telephone link 104 through video transmitter means 38, link 40 and panel 12 to the outside telecommunications channel 16. One example of a telephone control interface device is the product offered by the applicant under its trade-mark ESCORT. Such device functions to convert DTMF touchtones input by a telephone, either house phone 102 or a remote telephone calling into the premises via panel 12, into command signals which the security system can recognize and act on. This is achieved by connecting interface means 100 to panel 12 via bus 22. In addition, interface means 100 will interpret system status data received from panel 12 on bus 22 and convert same to a voice report which the user can easily understand. In this manner, any telephone becomes a keypad capable of controlling the operation of security system 10. This feature may be useful to remote users and central monitoring services alike.

Figure 3:
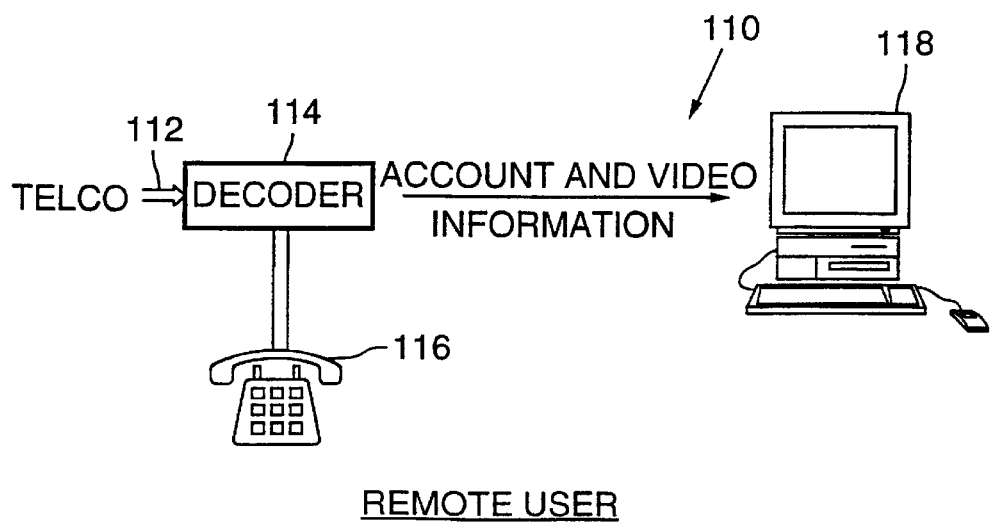
FIG. 3 is a schematic of the receiving system at a remote location for a remote user to receive transmissions from the security system of the invention.

Referring to FIG. 3, a system 110 that a user would use at a remote location to communicate with system 10 is shown. It consists of an incoming communication channel 112 received by decoder means 114. Decoder means 114 is connected to remote telephone 116 and also to a suitable display/storage system 118 which may advantageously be a microcomputer including a video terminal.

Using system 110, a remote user may initiate a telephone communication to security system 10. The telephone control interface device 100 is set to answer the incoming telephone call, which is routed to device 100 via line 16, panel 12, line 40, transmitter 38 and line 104, after a predetermined number of rings. The remote user may at his telephone 116 then punch in suitable control commands and the DTMF tones generated by telephone 116 will be interpreted and converted by interface means 100 into command codes transmitted on bus 22 to panel 12. Panel 12 receives such codes and acts accordingly.

For instance, the remote user may wish to use the video cameras 24 to inspect his house while he is away on holiday. He may telephone in to system 10 and punch in the appropriate codes and the panel 12 can issue suitable commands to the script selector means 30 via bus 22. The relevant images may then be captured and, in the same manner described previously, transferred by transmitter means 38 through the telecommunications system to the user's remote location. Decoder 114 will operate to receive whatever system data, including video data, has been transmitted and to display same on display means 118. In the same manner that a central monitoring service may request additional images, likewise a remote user would be able to do so as well.

Although various preferred embodiments of the present invention has been described herein in detail, it will be appreciated by those skilled in the art, that variations may be made thereto without departing from the spirit of the invention or the scope of the appended claims.

What is claimed is:

1. A video capture controller for selective capture of video images from a plurality of video source devices, said capture controller comprising:

multiple video signal inputs for receiving signals from video source devices;

an arrangement for receiving input signals from a security system;

a processor for processing the received input signals of said arrangement and comparing the received signals with a predetermined set of possible received signals and, based thereon, determining a particular video capture protocol from a set of video capture protocols associated with said set of possible received signals;

a controller associated with said multiple video signal inputs and said processor, said controller having a video output, said controller selectively connecting said multiple video inputs with said video output based on said particular protocol determined by said processor and wherein a plurality of said video capture protocols cause said controller to selectively sequentially connect at least two of said multiple video inputs with said video output.

2. The video capture controller of claim 1 further comprising:

frame grabber means for capturing an image from said video output and supplying same to a second video output.

3. The video capture controller of claim 2 further comprising:

a video storage system connected to said second video output for storing multiple video images;

a transmitter for transmitting the captured video images from said storage system to a remote location.

4. A video capture controller for selective capture of video images from a plurality of video source devices as claimed in claim 1 wherein, said set of possible received signals includes the receipt of different groups of signals from said security system and some of said video capture protocols cause said controller to selectively sequentially connect at least two of said multiple video inputs with said video output.

5. A process for capturing video images from multiple video sources in a security alarm system monitoring certain physical variables in or associated with a physical space, comprising:

monitoring said variables;

identifying a set of conditions for said variables;

selecting, in response to said set of conditions, a video image capture protocol from a pre-determined set of video image capture protocols each associated with at least one pre-determined set of said conditions;

capturing said video images in accordance with said selected protocol.

6. A process as claimed in claim 5 wherein the number of video images captured is less than the number of video sources.

7. A process as claimed in claim 5 further comprising:

repeating the execution of at least one selected protocol until such time as a new protocol is selected;

executing said new protocol one time only;

resuming selection and execution of a protocol only after receipt of a signal indicative that such selection and execution should resume.

8. A video capture controller for use in a system monitoring certain physical variables in or associated with a physical space, said system having multiple video sources, comprising:

means for storing a pre-determined set of video image capture protocols each associated with at least one pre-determined set of conditions for said variables;

means for receiving signals indicative of the condition of each said variable;

means for identifying a set of conditions for said variables;

means for retrieving from said storage means a specific video image capture protocol in response to said identified set of conditions; and, means for capturing video images from said video sources in accordance with said selected protocol.

9. A video capture controller as claimed in claim 8 wherein said variables include certain alarm variables and said receiving means comprises a dedicated input for receiving a signal indicative of the condition of each said alarm variable and other input means for receiving signals indicative of the condition of the other said variables.

10. A video capture controller as claimed in claim 9 wherein the number of video images captured is less than the number of video sources.

11. A security System communications console for monitoring certain physical variables in or associated with a physical space, said system adapted to receive signals from certain alarm detection devices distributed about said space, said signals being indicative of the condition of the variables being monitored by said devices, said console being adapted to connect to an external communication channel, comprising control panel means for receiving said signals, for determining in response thereto whether a status report on the conditions of the variables should be made to an external location via the external communication channel, and, if so, for making said report;

multiple video sources distributed about said space;

a video capture controller comprising means for storing a pre-determined set of video image capture protocols each associated with at least one pre-determined set of conditions for said variables, means for receiving from said alarm detection devices or from said panel signals indicative of the condition of each said variable, means for identifying a set of conditions for said variables, means for retrieving from said storage means a specific video image capture protocol in response to said identified set of conditions, and, means for capturing said video images in accordance with said selected protocol; and, video transmitter means for transferring said captured video images to the external communication channel in the event that the panel makes a status report to an external location.

12. A console as claimed in claim 11 wherein the panel is adapted to receive control inputs from a user and said variables include at least one variable controlled or monitored by the panel in response to a user input.

13. A console as claimed in claim 12 wherein the number of video images captured is less than the number of video sources.

14. A security system for monitoring certain physical variables in or associated with a physical space, said system being adapted to connect to an external communication channel, comprising:

alarm detection devices distributed about said space for generating signals indicative of the condition of the variables being monitored by said devices;

control panel means for receiving said signals, for determining in response thereto whether a status report on the conditions of the variables should be made to an external location via the external communication channel, and, if so, for making said report;

multiple video sources distributed about said space;

a video capture controller comprising means for storing a pre-determined set of video image capture protocols each associated with at least one pre-determined set of conditions for said variables, means for receiving from said alarm detection devices or from said panel signals indicative of the condition of each said variable, means for identifying a set of conditions for said variables, means for retrieving from said storage means a specific video image capture protocol in response to said identified set of conditions, and, means for capturing said video images in accordance with said selected protocol; and, video transmitter means for transferring said captured video images to the external communication channel in the event that the panel makes a status report to an external location.

15. A security system as claimed in claim 14 wherein said variables include at least one variable controlled by a user and the system further comprises user input means connected to the panel for entering commands relating to the status of said at least one variable.

16. A security system as claimed in claim 15 wherein the number of video images captured is less than the number of video sources.

* * * * *